Feb. 10, 1942.   L. C. LARSON   2,272,212
TURN SIGNAL APPARATUS
Filed Sept. 18, 1939
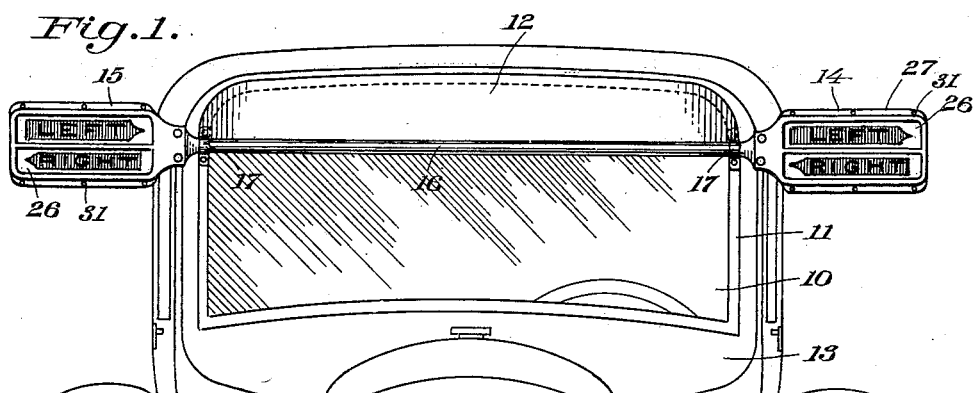
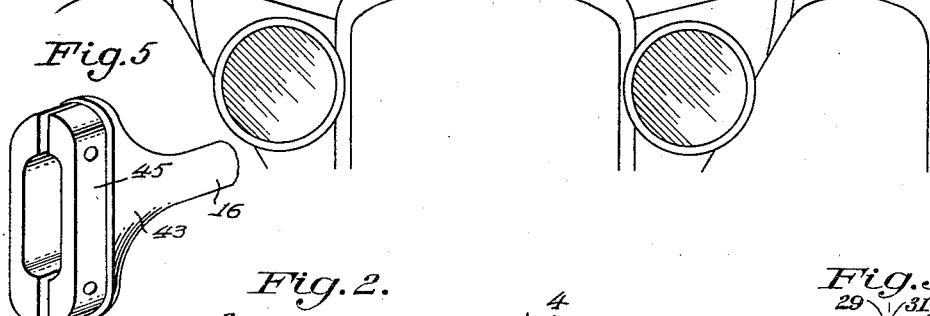
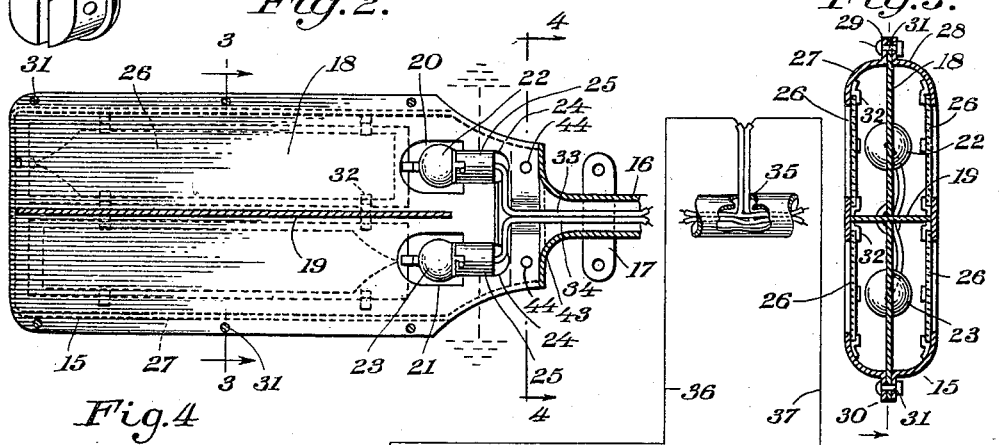
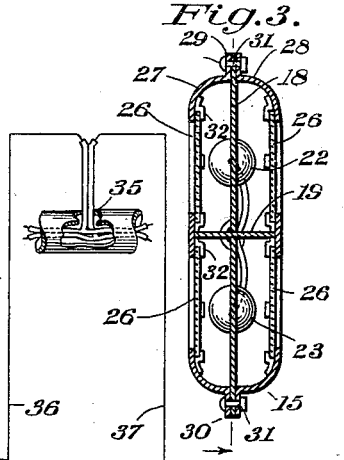
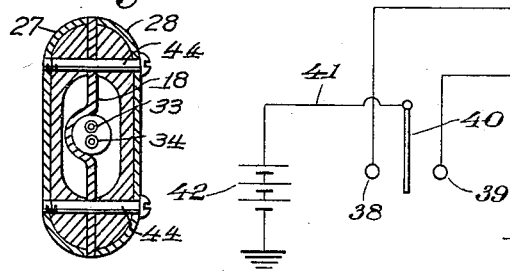
Lawrence C. Larson:
INVENTOR
BY Victor J. Evans & Co.
ATTORNEYS Patented Feb. 10, 1942

2,272,212

UNITED STATES PATENT OFFICE 2,272,212

TURN SIGNAL APPARATUS

Lawrence C. Larson, Callender, Iowa

Application September 18, 1939, Serial No. 295,503

1 Claim. (Cl. 177—329)

This invention relates to turn signal apparatus and has for an object to provide signal lamps which may be attached to the windshield and may be operated conveniently by the driver to indicate to approaching traffic and also to following traffic, an intended turn.

A further object is to provide for a device of this character which may be easily attached to vertical or sloping windshields without the use of special tools, which will be formed of a few strong, simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification:

Figure 1 is a fragmentary front elevation of an automobile showing turn signal apparatus constructed in accordance with the invention, in applied position.

Figure 2 is a front elevation of one of the signal lamps with a portion removed to expose the vertical reflecting partition and lamp bulbs carried thereby, the electrical connection of the lamps also being shown diagrammatically.

Figure 3 is a cross-sectional view of one of the lamps taken on line 3—3 of Figure 2.

Figure 4 is a cross sectional view taken on the line 4—4 of Figure 2.

Figure 5 is a detail perspective view of one flared and flattened end of the lamp supporting tubular arm.

Referring now to the drawing in which like characters of reference designate similar parts in the various views, 10 designates the windshield, 11 the windshield frame, and 12 the sun visor of a conventional automobile 13.

The turn signal apparatus comprising the subject matter of this invention includes a pair of signal lamps 14 and 15 connected together by a tubular arm 16 which is adjustably connected to the windshield frame through the medium of strap clamps 17. The tubular arm and clamps are so located at the bottom of the sun visor as not to interfere with the vision of the driver. The tubular arm may be turned axially in the clamps to dispose the signal lamps in proper position to face the traffic, whether the windshield is vertical or sloped.

The signal lamps project exteriorly beyond the sides of the vehicle so as to be easily viewed from the front and rear of the vehicle. Each lamp comprises a vertical and a horizontal partition 18 and 19 respectively, as best shown in Figure 3. The horizontal partition is comparatively narrow and projects from the center of opposite sides of the vertical partition. The bracket arm 16 is connected to the vertical partitions 18 of both lamps as will be presently described and all of the partitions are preferably formed of polished metal, as shown in Figure 2, to serve as reflectors.

The vertical partition of each lamp is provided above and below the horizontal partition with openings 20 and 21 to receive respective signal bulbs 22 and 23. Each opening is provided with an extension 24 adapted to have suitably secured therein the socket 25 of the respective signal lamp bulb.

Glass panels 26 are disposed in front and in rear of the signal lamps and are provided above and below the central partition with distinctively colored arrows indicative of a left turn and a right turn. The panels are carried by a sectional frame comprising a front section 27 and a rear section 28 having marginal flanges 29 and 30 through which clamp bolts 31 are passed, as shown in Figure 3. The sections of the frame are provided with suitable angular strips 32 which coact with the sections to form channels which receive the marginal edges of the glass panels.

In the present embodiment of the invention the circuit wires 33 and 34 of the upper lamp bulb and lower lamp bulb respectively of each signal lamp, are carried through the tubular bracket arm 16 and at a preferred point 35 are directed outwardly from the tubular bracket arm and connected by respective wires 36 and 37 to respective stationary switch contacts 38 and 39 of a switch located within convenient reach of the driver. A movable switch contact 40 is connected by a wire 41 to the positive terminal of the vehicle battery 42, or other source of electricity, so that the driver may energize a selected one of the signal bulbs by simply swinging the movable contact 40 into engagement with a predetermined one of the stationary contacts 38 and 39.

It will be observed that the ends of the tubular bracket arm 16 are provided with flared portions 43, best shown in Figure 2, which are flattened out as shown at 45 in Figure 5 to receive the projecting end of the vertical partition of a respective signal lamp. Screws 44 or other connectors are passed through said projecting end of the partition and through the flattened extremity of the tubular bracket arm to secure the lamp to the bracket arm.

In operation when the driver desires to indicate an intended change of direction to both approaching and following traffic, he simply swings the movable contact 40 into contact with the particular one of the stationary switch contacts 38 and 39 which will close a circuit through the conductor wires to a selected one of the signal lamp bulbs back of the direct arrow which is indicative of the turn he intends to make.

From the above description it is thought that the construction and operation of the invention will be fully understood without further explanation.

What is claimed is:

A turn signal lamp comprising a vertical and horizontal partition, the horizontal partition being comparatively narrow and projecting from opposite sides of the vertical partition, a sectional casing comprising a front section and a rear section having marginal flanges bolted to the vertical partition at its top and bottom and extending above and below the horizontal partition, there being openings in the vertical partition above and below the horizontal partition at one end of the casing, signal bulbs in said openings, translucent panels disposed in front and in rear of the signal bulbs provided above and below the horizontal partition with indicia indicative of a left and right turn, means on the casing to secure the panels to the casing, a tubular bracket arm provided with a flared end portion terminally flattened out and provided with a slot receiving one end of the vertical partition which projects beyond the horizontal partition, bolts passed through the casing and through said projecting end of the partition and through the flattened out portion of the bracket arm to secure the bracket arm to the partition and casing, and circuit wires for the signal bulbs extending from the signal bulbs through the tubular bracket arm and adapted to be connected to a source of electricity.

LAWRENCE C. LARSON.